(12) United States Patent
Melamed et al.

(10) Patent No.: US 9,911,437 B2
(45) Date of Patent: *Mar. 6, 2018

(54) SYSTEM AND METHOD FOR IMPROVING SPEECH RECOGNITION ACCURACY USING TEXTUAL CONTEXT

(71) Applicant: Nuance Communications, Inc., Burlington, MA (US)

(72) Inventors: Dan Melamed, New York, NY (US); Srinivas Bangalore, Morristown, NJ (US); Michael Johnston, New York, NY (US)

(73) Assignee: Nuance Communications, Inc., Burlington, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/146,283

(22) Filed: May 4, 2016

(65) Prior Publication Data

US 2016/0247521 A1 Aug. 25, 2016

Related U.S. Application Data

(63) Continuation of application No. 14/737,708, filed on Jun. 12, 2015, now Pat. No. 9,355,638, which is a
(Continued)

(51) Int. Cl.
*G10L 15/00* (2013.01)
*G10L 25/51* (2013.01)
(Continued)

(52) U.S. Cl.
CPC ............. *G10L 25/51* (2013.01); *G06F 3/162* (2013.01); *G10L 15/05* (2013.01); *G10L 15/07* (2013.01);
(Continued)

(58) Field of Classification Search
CPC .... H04M 3/4938; G10L 15/26; G10L 15/063; G10L 15/183; G10L 15/187; G10L 15/19; G10L 15/18; G10L 15/193; G10L 15/06
(Continued)

(56) References Cited

U.S. PATENT DOCUMENTS 5,819,220 A * 10/1998 Sarukkai ............. H04M 3/4938
704/240
6,076,059 A * 6/2000 Glickman ............... G10L 15/26
704/252
(Continued)

*Primary Examiner* — Huyen Vo

(57) ABSTRACT

Disclosed herein are systems, methods, and computer-readable storage media for improving speech recognition accuracy using textual context. The method includes retrieving a recorded utterance, capturing text from a device display associated with the spoken dialog and viewed by one party to the recorded utterance, and identifying words in the captured text that are relevant to the recorded utterance. The method further includes adding the identified words to a dynamic language model, and recognizing the recorded utterance using the dynamic language model. The recorded utterance can be a spoken dialog. A time stamp can be assigned to each identified word. The method can include adding identified words to and/or removing identified words from the dynamic language model based on their respective time stamps. A screen scraper can capture text from the device display associated with the recorded utterance. The device display can contain customer service data.

19 Claims, 4 Drawing Sheets

Related U.S. Application Data continuation of application No. 14/061,855, filed on Oct. 24, 2013, now Pat. No. 9,058,808, which is a continuation of application No. 12/604,628, filed on Oct. 23, 2009, now Pat. No. 8,571,866.

(51) Int. Cl.
| | | |
|---|---|---|
| *G10L 15/19* | (2013.01) | |
| *G10L 17/04* | (2013.01) | |
| *G10L 15/18* | (2013.01) | |
| *G06F 3/16* | (2006.01) | |
| *G10L 15/05* | (2013.01) | |
| *G10L 15/07* | (2013.01) | |
| *G10L 15/30* | (2013.01) | |
| *G10L 15/183* | (2013.01) | |

(52) U.S. Cl.
CPC .............. *G10L 15/18* (2013.01); *G10L 15/19* (2013.01); *G10L 15/30* (2013.01); *G10L 17/04* (2013.01); *G10L 15/183* (2013.01)

(58) Field of Classification Search
USPC .............. 704/231, 235, 238–256, 270, 270.1
See application file for complete search history.

(56) References Cited

U.S. PATENT DOCUMENTS

| | | |
|---|---|---|
| 6,219,643 B1 | 4/2001 | Cohen et al. |
| 7,584,102 B2 | 9/2009 | Hwang et al. |
| 7,653,183 B2 | 1/2010 | Patel et al. |
| 7,655,183 B2 | 2/2010 | Benn et al. |
| 7,840,407 B2 | 11/2010 | Byrne et al. |
| 2005/0137867 A1* | 6/2005 | Miller .................... G10L 15/26 704/252 |
| 2006/0041427 A1* | 2/2006 | Yegnanarayanan ... G10L 15/063 704/235 |
| 2007/0208567 A1 | 9/2007 | Amento et al. |

* cited by examiner

SYSTEM AND METHOD FOR IMPROVING SPEECH RECOGNITION ACCURACY USING TEXTUAL CONTEXT

CROSS-REFERENCE TO RELATED APPLICATIONS

The present application is a continuation of U.S. patent application Ser. No. 14/737,708, filed Jun. 12, 2015, which is a continuation of U.S. patent application Ser. No. 14/061, 855, filed Oct. 24, 2013, now U.S. Pat. No. 9,058,808, which is a continuation of U.S. patent application Ser. No. 12/604, 628, filed Oct. 23, 2009, now U.S. Pat. No. 8,571,866, the contents of the foregoing of which are incorporated by reference in their entirety.

FIELD OF THE DISCLOSURE

The present disclosure relates to speech recognition and more specifically to improving speech recognition accuracy based on related text. Introduction

INTRODUCTION

Call centers and other voice-based customer service interfaces often record speech for later data mining to determine trends, customer satisfaction rates, etc. However, automatic speech recognition (ASR) often fails on such recorded speech, produces erroneous recognition results, or encounters difficulty when recognizing speech from customer service and related speech applications because the vocabulary is different from what is regularly expected. While ASR grammar models can be generally trained for domain-specific tasks, this type of recorded speech often includes frequently-used words that are beyond the domain-specific grammar model. Such vocabulary-based difficulties in ASR present problems for data mining and other applications of recorded speech.

SUMMARY

Accurate ASR from voice data alone is a difficult problem. However, in some situations, an ASR system has access to other data beyond the voice data that makes speech recognition less difficult. In particular, if the other data includes text mentioned in the voice data, then the ASR system improve its predictions about what is being said based on that text. One compelling example is when a contact center agent is talking on the phone with a customer about a product or service that the customer has purchased. An automatic system can record such conversations and transcribe them into text using ASR for later use in data mining. In this context, the agent's computer monitor often contains a great deal of relevant information about the customer and/or the product being discussed. Words such as people's names, addresses, other personal information, and product names are often the most difficult for ASR systems because they are not in even a domain- or task-specific vocabulary. The system can capture words from the agent's monitor and add them to the ASR system's "cache language model" to improve recognition accuracy.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for improving speech recognition accuracy using textual context. The method can be practiced by a suitably configured system. The system retrieves a recorded utterance, captures text from a device display associated with the spoken dialog and viewed by one party to the recorded utterance, identifies words in the captured text that are relevant to the recorded utterance, adds the identified words to a dynamic language model, and recognizes the recorded utterance using the dynamic language model. The recorded utterance can be a spoken dialog. The system can assign a time stamp to each identified word. The system can add identified words to the dynamic language model and/or remove identified words from the dynamic language model based on its respective assigned time stamp. A screen scraper can capture text from the device display associated with the recorded utterance. The device display can contain customer service data. The captured text can be a name, a location, a phone number, an account type, and/or a product name.

In one aspect, the system further determines an utterance category based on the captured text, and adds utterance category specific words to the dynamic language model. In another aspect, the system identifies a user in the dialog, and saves the dynamic language model as a personalized dynamic language model associated with the identified user. The system can then retrieve a second spoken dialog including the identified user, load the personalized dynamic language model associated with the identified user, and recognize the second spoken dialog using the personalized dynamic language model. Adding the identified words to a dynamic language model can include rescoring an existing language model. Identifying words in the captured text that are relevant to the recorded utterance can include extracting from the captured text references to external data, retrieving the external data, identifying data of interest in the parsed data, and adding the identified data of interest to the dynamic language model.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION OF THE DRAWINGS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
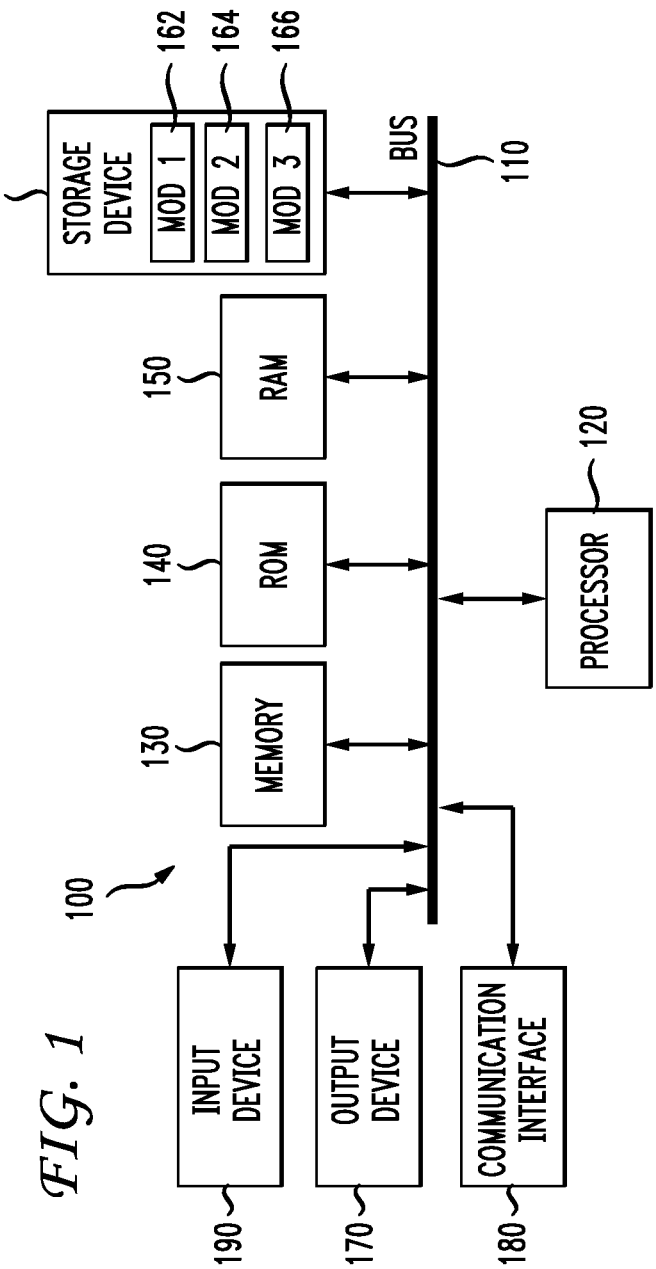
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
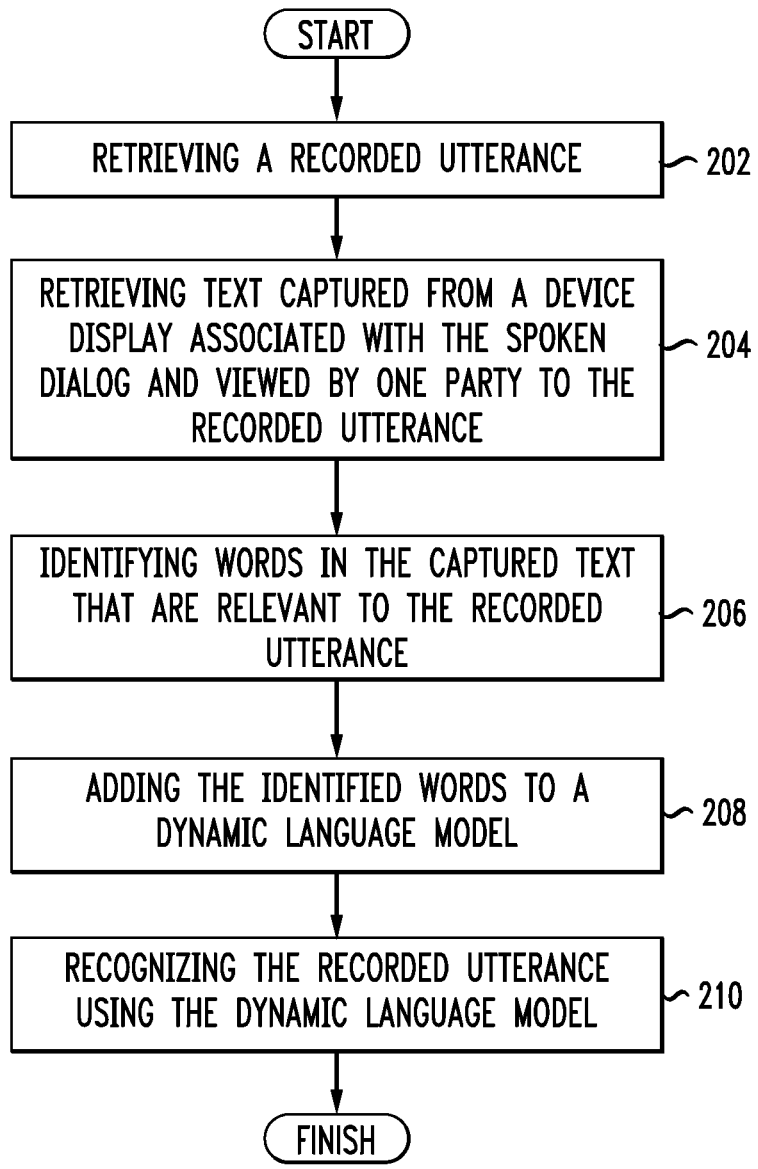
FIG. 2 illustrates an example method embodiment for improving speech recognition accuracy using textual context.

Having disclosed some basic system components, the disclosure now turns to the exemplary method embodiment shown in FIG. 2. For the sake of clarity, the method is discussed in terms of an exemplary system such as is shown in FIG. 1 configured to practice the method.

FIG. 2 illustrates an exemplary method embodiment for improving speech recognition accuracy using textual context. A system configured to practice the method retrieves a recorded utterance (202) and retrieves text captured from a device display associated with the spoken dialog and viewed by one party to the recorded utterance (204). The recorded utterance can be a spoken dialog between two persons, a dialog between a person and an automated system, or any other type of utterance. One example is a telephone call between a customer and a live and/or automated customer service agent. In one aspect, a screen scraper captures text from the device display associated with the recorded utterance. The screen scraper can be a program running on a computer, such as a customer service terminal. The screen scraper can also be a server that remotely monitors the device display. In yet another variation, the screen scraper can process recorded device display output at a later time. The screen scraper can recover data from the entire device display or an indicated portion of the device display. Some examples of captured text include a name, a location (such as an address), a phone number, an account type, or a product name. The system can further determine an utterance category based on the captured text and add utterance category specific words to the dynamic language model. For example, if the captured text includes the phrase "AT&T U200 Digital Television", the system can load specific terminology associated with that package and also load television channel names included in that package such as LOGO, DIY network, and Bloomberg Television.

The system identifies words in the captured text that are relevant to the recorded utterance (206) and adds the identified words to a dynamic language model (208). In one embodiment, identified words are assigned time stamps based on a timing relative to the recorded utterance. For example, if the system identifies the word "modem" a corresponding time stamp identifies a position within the recorded utterance where the word "modem" appeared on the device display. Time stamps can indicate a begin and an end time of identified words. The system can add words to the dynamic language model based on a begin time stamp and remove words from the dynamic language model based on an end time stamp. When the dynamic language model has a maximum threshold of added words, the system can leave added words in the dynamic language model after the end time stamp until the dynamic language model is "full" and the system must add new words. The system can add and remove words from the dynamic language model at the exact time of the timestamp, slightly before, and/or slightly after.

In one variation, the system uses a decay time to determine when to remove words from the language model. The decay time can be based on how the word appeared on the device display. For example, if a single word occurred in numerous places, prominently, or multiple times in a short period, then the system can lengthen the decay time. Conversely, if a word appears once on the device display in a non-prominent position or in a very small font, the system can set a short decay time for that word in the language model. When the system encounters another instance of a word, such as on the device display or as recognized speech, the system can renew the decay interval for that word. For example, if the system extracts the word "apartment" from an initial screen on the device display and later the decay interval for the word "apartment" is about to expire, a successful recognition of the word "apartment" in the speech can renew the decay interval. The decay interval can also be based on system capabilities such as processing speed.

The system can add identified words to a dynamic language model by rescoring an existing language model. In some cases, the system identifies other information besides text which provides insight into how to better recognize the utterances or dialog. This other information can refer to external data, such as a website, Twitter address, or other reference. If the connection is a computer network connection, such as a Voice over IP (VoIP) connection, the system can also gather information from sources which are not visible during the call, but which were viewed by one of the dialog participants earlier, such as a browser history. The system can extract from the captured text references to external data, retrieve at least part of the external data, identify data of interest in the parsed data, and add the identified data of interest to the dynamic language model.

Then the system can recognize the recorded utterance using the dynamic language model (210). In another aspect, the system identifies a user in the dialog and saves the dynamic language model as a personalized dynamic language model associated with the identified user. For example, if the system recognizes that a user is frequently involved in utterances or dialogs on a particular theme or topic, the system can save a personalized language model tuned to a particular vocabulary unique to that user. The system can then retrieve another spoken dialog including the identified user, load the personalized dynamic language model associated with the identified user, and recognize the second spoken dialog using the personalized dynamic language model.

Figure 3:
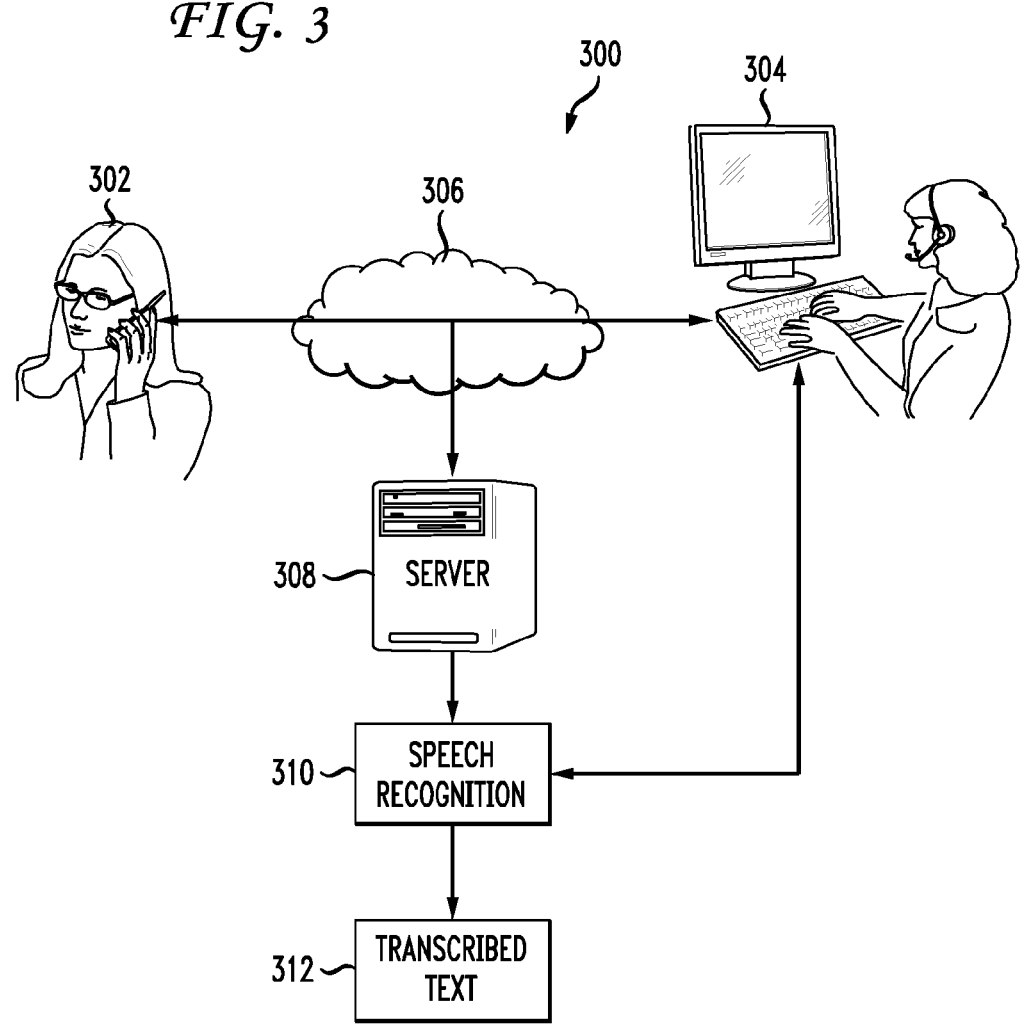
FIG. 3 illustrates an exemplary system configuration.

FIG. 3 illustrates an exemplary system configuration 300. The user 302 has a dialog with a customer service agent 304 over a communications network 306 such as the public switched telephone network or the Internet. As discussed above, a monolog or utterances from a single user can easily substitute for the dialog. A server 308 records the dialog. The server 308 can also be integrated as part of the customer service agent's computing device. The server 308 passes the recorded dialog to a speech recognition module 310 which can be separate or integrated into the server 308. The speech recognition module 310 gathers input from the display of the customer service agent 304, but can also examine the display of the user 302. The system can record input from the display(s) and correlate the input to the recorded dialog. The speech recognition module 310 identifies words in the captured text that are relevant to the recorded dialog and adds the identified words to a dynamic language model. The speech recognition module then recognizes the recorded dialog using the dynamic language model to generate transcribed text 312.

Figure 4:
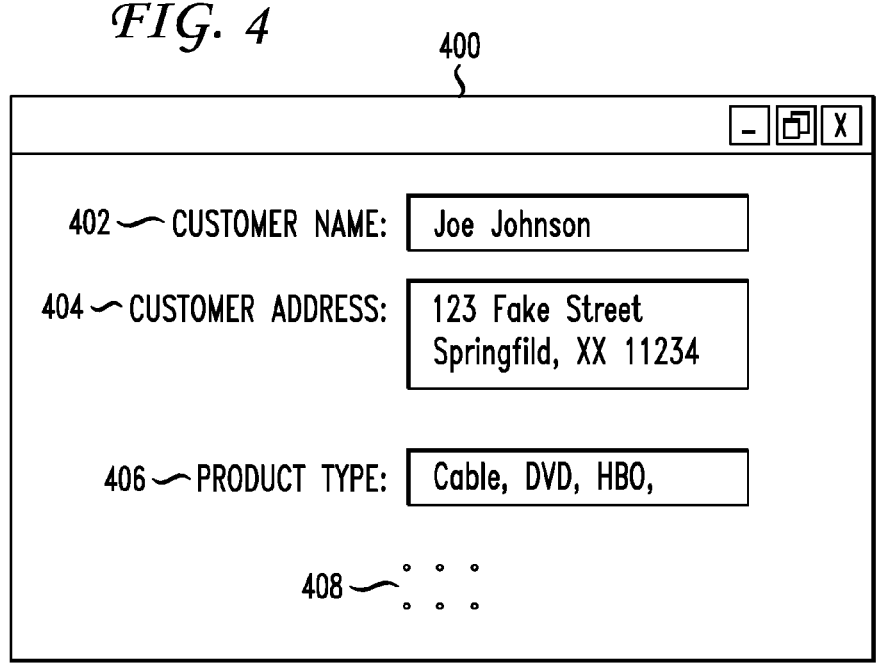
FIG. 4 illustrates an exemplary display of relevant information.

FIG. 4 illustrates an exemplary display 400 of relevant information, such as that shown to a customer service agent. The display can include a customer name 402, customer address 404, product type 406 that is the subject of the customer service call, and other items 408. In a specialized application where the system knows exactly where and what to expect on the device display, the system can focus narrowly on specific portions of the display for extracting relevant information for use in a dynamic language model. In more fluid or general applications, the system can capture the entire screen or an entire window area on the screen and analyze the captured portion for relevant information by optical character recognition (OCR) and/or other suitable approaches. The system can also record user interactions and non-traditional inputs associated with the displays, such as keystrokes, mouse clicks, mouse movement, gestures, device position and orientation information, etc. The system can then use this input in addition to information "scraped" from the screen to customize the dynamic language model.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
   identifying, by a processing system including a processor, words in textual content that are relevant to a recorded utterance based on references within the textual content, to yield identified words;
   associating, by the processing system, the identified words with a speech recognition model to generate a modified speech recognition model;
   removing a word of the identified words from the modified speech recognition model according to an end time stamp assigned to the word; and
   recognizing, by the processing system, the recorded utterance using the modified speech recognition model.

2. The method of claim 1, wherein the references comprises information associated with a product or a service.

3. The method of claim 2, wherein the textual content is presented on a display of an agent interacting with a user to assist in a purchase of the product or service.

4. The method of claim 1, wherein the references are associated with social media content.

5. The method of claim 1, wherein the recorded utterance is a portion of a spoken dialog.

6. The method of claim 1, wherein each word in the identified words is assigned a beginning time stamp and the end time stamp, and wherein the associating the identified words comprises adding each word to the modified speech recognition model according to the beginning time stamp assigned to each word.

7. A system, comprising:
   a processing system including a processor; and
   a memory that stores executable instructions that, when executed by the processing system, facilitate performance of operations, comprising:
   generating identified words by detecting words in textual content that are relevant to a recorded utterance based on external references included in the textual content;
   adding the identified words to a speech recognition model to generate a modified speech recognition model;
   removing a word of the identified words from the modified speech recognition model according to an end time stamp assigned to the word; and
   identifying the recorded utterance using the modified speech recognition model.

8. The system of claim 7, wherein the external references comprises information relating to a product or a service.

9. The system of claim 8, wherein the textual content is presented on a display during a purchase of the product or service.

10. The system of claim 7, wherein the external references are associated with media content.

11. The system of claim 7, wherein the recorded utterance is a portion of a speech dialog.

12. The system of claim 7, wherein each word in the identified words is assigned a beginning time stamp and an end time stamp.

13. The system of claim 12, wherein the adding the identified words comprises adding each word to the modified speech recognition model according to the beginning time stamp assigned to each word, and wherein the operations further comprise removing each word from the modified speech recognition model according to the end time stamp assigned to each word.

14. A non-transitory machine-readable storage medium, comprising executable instructions that, when executed by a processing system including a processor, facilitate performance of operations, comprising:
   generating identified words based on a display of textual content that is relevant to a recorded utterance, the textual content including references to external data;
   linking the identified words to a speech recognition model to generate a modified speech recognition model;
   removing a word of the identified words from the modified speech recognition model according to an end time stamp assigned to the word; and interpreting the recorded utterance using the modified speech recognition model.

15. The non-transitory machine-readable storage medium of claim 14, wherein the external data comprises information relating to a product or a service.

16. The non-transitory machine-readable storage medium of claim 15, wherein the text is presented on a display to assist in a purchase of the product or service.

17. The non-transitory machine-readable storage medium of claim 14, wherein the external data is associated with media content.

18. The non-transitory machine-readable storage medium of claim 14, wherein the recorded utterance comprises speech content.

19. The non-transitory machine-readable storage medium of claim 14, wherein each word in the identified words is assigned a beginning time stamp, and wherein the linking the identified words comprises adding each word to the modified speech recognition model according to the beginning time stamp.

* * * * *